United States Patent

[11] 3,627,622

| [72] | Inventor | Guadalupe Vega<br>Midland, Tex. |
|---|---|---|
| [21] | Appl. No. | 671,790 |
| [22] | Filed | Sept. 29, 1967 |
| [45] | Patented | Dec. 14, 1971 |
| [73] | Assignee | The Dow Chemical Company<br>Midland, Mich. |

[54] PARTIAL RESIN COATED FOAMED RESINOUS ARTICLES
3 Claims, 1 Drawing Fig.

[52] U.S. Cl. .................................................. 161/159,
161/161, 161/165, 161/166, 156/313, 117/98
[51] Int. Cl. ...................................................... B32b 3/26

[50] Field of Search .................................. 156/313;
161/161, 160, 165, 166, 159; 117/98

[56] References Cited
UNITED STATES PATENTS

| 3,133,853 | 5/1964 | Knox ............................ | 161/160 |
|---|---|---|---|
| 3,194,708 | 7/1965 | Fourcade et al. ............. | 161/161 |
| 3,437,551 | 4/1969 | Marshack ..................... | 161/160 |
| 3,269,887 | 8/1966 | Windecker .................... | 161/160 |

*Primary Examiner*—William J. Van Balen
*Attorneys*—Griswold & Burdick, Richard G. Waterman and Robert B. Ingraham ABSTRACT: An open-celled foam body is prepared, having at least one rigid surface, by impregnating one surface of an open-celled foam with a hardenable resinous material, hardening the resin to provide a foam structure having a rigid portion and a flexible portion.

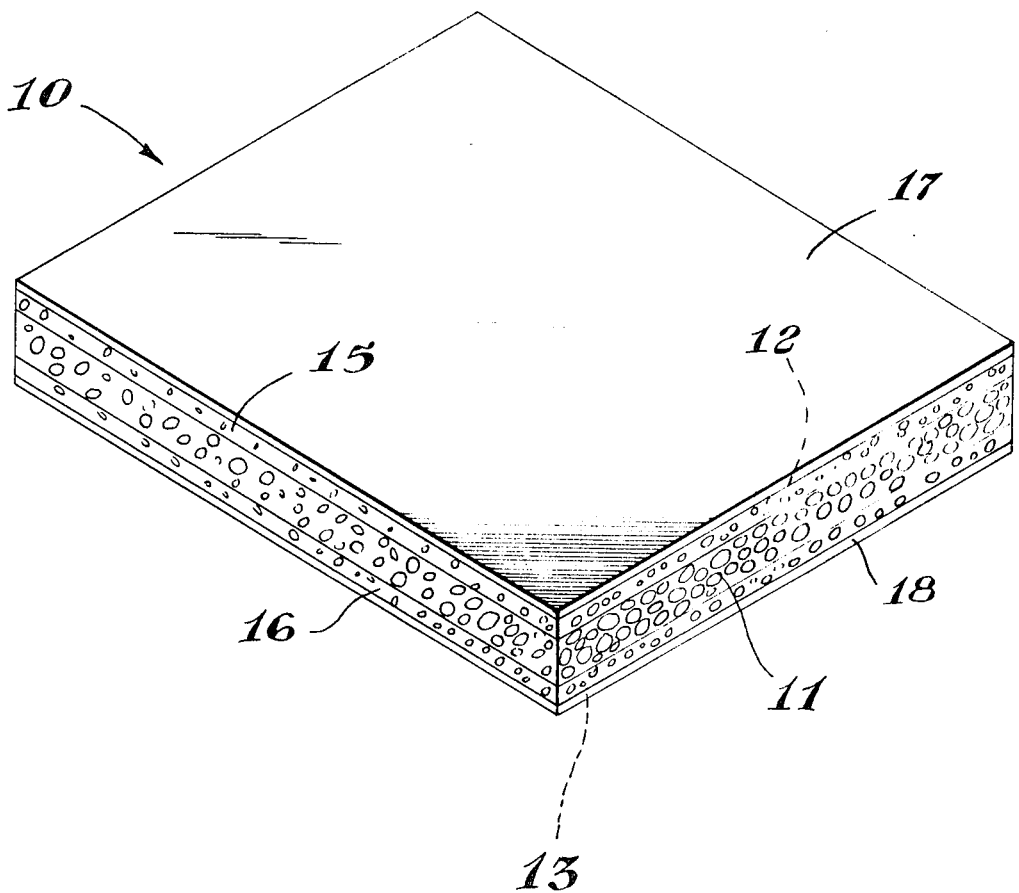

PARTIAL RESIN COATED FOAMED RESINOUS ARTICLES

This invention relates to the preparation of laminar structures having rigid and flexible portions, and more particularly relates to the preparation of laminar structures having at least one rigid external surface and a portion of the body being of a flexible foamed nature.

For many applications, it is desirable to employ foamed resins where lightweight high-strength cushioning and rigidity are desired. Frequently, it is desired to employ composite foamed bodies wherein a flexible layer and a rigid layer are provided, the rigid layer providing cushioning, impact resistance, vibration damping and the like. Such bodies oftentimes are prepared by laminating a rigid foamed resin to a flexible foamed resin to provide the desired characteristics. Oftentimes, such laminated foamed structures are prepared with rigid skin and are useful as structural panels. Such panels may have flat or curved surfaces. Beneficially, lamination of foamed resins is frequently difficult as foam resins inherently offer a relatively small area of contact when two foam bodies are placed in face to face relationship as contact of the severed foam surfaces with the opposite surface is a matter of chance due to the generally random arrangement of the voids within the foam body.

It would be desirable if there were provided an improved laminar foamed resinuous structure having a rigid portion and a flexible portion.

It would also be desirable if there were an improved method for providing a laminar foamed body having rigid and flexible portions.

It would also be advantageous if there were available an improved panel comprising rigid surface portions of foamed resin and having a core of a flexible resin.

These benefits and other advantages in accordance with the present invention are achieved in a method for preparing a laminar foam article, the method comprising providing a flexible open-celled foam body having at least one major surface, impregnating a portion of the flexible open-celled foam body adjacent one surface with a resinous material which hardens to produce a tough rigid resin while preserving the open-celled nature of the foam.

Also contemplated within the scope of the present invention is a laminar open-celled foam resinuous article comprising a flexible open-celled foam having at least one major surface, the portion of the foam body adjacent one major surface having a coating of a hardened resin thereon, the cells of the foam remaining substantially open.

Further features and advantages of the present invention will become more apparent from the following specification when taken in connection with the drawing wherein:

In the FIGURE there is depicted a structure in accordance with the present invention generally designated by the reference numeral 10. The structure 10 comprises a core of a flexible open-celled foam generally designated by the reference numeral 11. The flexible open-celled foam has a first major surface 12 and a second major surface 13. The core 11 has a first impregnated region 15. The impregnated region 15 is disposed adjacent the surface 12 and consists of the flexible open-celled foam wherein the foam is coated with a hardened resin which renders the region 15 rigid while retaining its open-celled nature. A similar impregnated zone 16 is disposed adjacent the second major surface 13. A rigid skin or surface layer 17 is adhered to the surface 12 and a second rigid skin or surface layer 18 is adhered to the surface 13.

Flexible foam may be of any commercially available materials such as flexible polyurethane, sponge rubber, cellulose foam, vinyl chloride polymer foam and the like. The foam must have at least 50 percent, and preferably 85 percent, open cells to permit impregnation with the settable or hardenable resin. The particular method employed to impregnate the foam is not critical. One simple but effective method is that of placing the flexible foam in a shallow pan or vat containing liquid hardenable resin to a depth slightly less than the depth of the impregnation, placing the flexible foam within the vat, raising it from the vat and allowing the excess resin to drain therefrom under the influence of gravity.

Alternately, a predetermined quantity of resin is placed upon a surface, flexible foam brought into contact with the surface and compressed to a degree sufficient to force the resin into the open cells of the foam to a desired depth.

A flexible foam body may be treated in accordance with the invention by spraying a hardenable settable material thereon which is sufficiently fluid to penetrate to a desired depth. The extremely viscous settable resins are not readily applied to small open-celled foams by this technique. To provide penetration of the foam to any great depth, subsequent mechanical working of the foam tends to force a viscous resin therein to the desired depth. The quantity of resin applied to the flexible foam is sufficient to render it rigid and still retain the open cellular structure and provide the desired physical properties. If extremely low density foam is desired, a minimal quantity of resin is applied to the flexible foam, whereas greater quantities are applied when the rigidity requirement increases.

The epoxy resins are effective hardening agents for the foam. The diglycidyl ethers of bisphenol A having an epoxide equivalent weight of about 170–192 and a viscosity of 4,000–14,000 centipoises at 25° C. may be used along with a curing agent. Appropriate curing agents include the aliphatic polyamines or polyamides as well as acid anhydrides such as that of phthalic acid and the aromatic amines such as methylenedianiline. These agents will effect a cure within a period of a few hours at ambient temperature, or the rate of cure may be accelerated by heating the resin. In some instances it may be desirable to impregnate the foam with a resin containing little or no curing agent and add the curing agent later. Foam impregnated with an epoxy resin may be laid up then permeated with $BF_3$, a gaseous agent capable of effecting a rapid cure. The unsaturated polyester resins commonly used in laminations also may be used to impregnate and harden the foam. In some instances it may be desirable to mix the impregnating resin with a solvent or another agent which promotes the wetting of the flexible foam by the resin.

Advantageously, laminar foam bodies of the present invention are readily obtained in a flat or sheetlike form or alternately, they may be cured to provide an article having curved surfaces. Oftentimes, it is advantageous to apply to the freshly impregnated flexible foam a rigid skin such as wood or laminated resins such as epoxy and polyester resins containing glass fibers. The resultant panels prepared in this manner are tough and shock resistant, as a central core of unimpregnated flexible foam remains in the center.

By way of further illustration, a structural panel is prepared employing a sheet of polyether-polyurethane open-celled flexible foam 3 feet wide, 5 feet long and 3 inches thick having a density of 1.5 pounds per cubic foot. An epoxy resin composition of diglycidyl ether of bisphenol A containing diethylene diamine as a catalyst or curing agent is prepared and sprayed onto a major surface of the sheet until the sheet is impregnated to a depth of about 1 inch. The opposite side of the sheet is similarly treated. A ⅛-inch epoxy resin fiber glass laminate is placed on either side of the sheet and the resin permitted to cure at room temperature. The panel is strong, the skins tightly adherent thereto and the panel provides excellent vibration isolation.

Similar beneficial and advantageous results are achieved when a phenol-formaldehyde resin is employed in place of the diglycidyl ether of bisphenol A composition and plywood faces substituted for the epoxy resin glass fiber laminate. A 2-inch thick slab of a flexible polyether-polyurethane foam is impregnated to a depth of about ¼ inch on either side with a previously described epoxy resin composition (diglycidyl ether of bisphenol A) and prior to curing, sandwiched between two polyether glass fiber chair bottoms to form a laminated structure which is eminently satisfactory as a tractor seat and provides vibration isolation.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set and defined in the hereto-appended claims.

What is claimed is:

1. A laminar open-celled foam resinous article comprising a flexible open-celled foam resinuous body having at least one major surface, a portion of the foam body adjacent one major surface having
a coating of a hardened resin thereon, the cells of the foam body remaining substantially open and thereby providing a rigid portion and a flexible portion of the foam body.

2. The body of claim 1 wherein the body has two major surfaces and the portion adjacent each of the major surfaces having the hardened resin thereon and an area lying between the major surfaces having no hardened resin.

3. The body of claim 2 having rigid impermeable skins adhered to each of the major surfaces.

* * * * *